(12) United States Patent
Mansfield et al.

(10) Patent No.: US 10,782,147 B2
(45) Date of Patent: Sep. 22, 2020

(54) GYROSCOPE IN-FIELD PROGNOSTICS

(71) Applicant: Atlantic Inertial Systems Limited, Plymouth, Devon (GB)

(72) Inventors: Thomas Mansfield, Saltash (GB); Matthew Williamson, Plymouth (GB)

(73) Assignee: ATLANTIC INERTIAL SYSTEMS LIMITED, Plymouth, Devon (GB)

( * ) Notice: Subject to any disclaimer, the term of this patent is extended or adjusted under 35 U.S.C. 154(b) by 214 days.

(21) Appl. No.: 15/904,515

(22) Filed: Feb. 26, 2018

(65) Prior Publication Data

US 2018/0259359 A1    Sep. 13, 2018

(30) Foreign Application Priority Data

Mar. 7, 2017 (GB) .................................. 1703638.5

(51) Int. Cl.
*G01C 25/00* (2006.01)
*G01C 19/5776* (2012.01)
*G01C 19/5726* (2012.01)
*G01C 19/5755* (2012.01)

(52) U.S. Cl.
CPC .......... *G01C 25/00* (2013.01); *G01C 19/5726* (2013.01); *G01C 19/5755* (2013.01); *G01C 19/5776* (2013.01)

(58) Field of Classification Search
CPC ............ G01C 19/5726; G01C 19/5755; G01C 19/5776; G01C 25/00; G01C 19/5684; G01L 9/0052; G01L 9/04; B81C 1/00142; B81C 1/005; B81B 3/0072
See application file for complete search history.

(56) References Cited

U.S. PATENT DOCUMENTS

| | | | | |
|---|---|---|---|---|
| 4,875,774 A | * | 10/1989 | Tazartes | G01C 19/662 356/459 |
| 5,287,033 A | * | 2/1994 | Morton | G01C 19/567 310/316.01 |
| 5,419,194 A | | 5/1995 | Varnham et al. | |
| 5,481,914 A | * | 1/1996 | Ward | G01C 19/5719 73/504.16 |
| 7,062,403 B2 | * | 6/2006 | Betz | G01C 19/56 702/145 |

(Continued)

OTHER PUBLICATIONS

European Search Report for Application No. 18158458.2-1003, dated Aug. 7, 2018, 10 pages.

(Continued)

*Primary Examiner* — Francis C Gray
(74) *Attorney, Agent, or Firm* — Cantor Colburn LLP (57) ABSTRACT

A method for determining an operational characteristic of a vibrating structure gyroscope having a movable mass includes: driving the mass to oscillate along a first, predefined path; rotating the vibrating structure gyroscope so as to oscillate the mass along a second path, wherein the second path is different to the first, predefined path; sensing the oscillation of the mass along the second path so as to generate a sensing signal; converting the sensing signal into an in-phase signal and an out-of-phase signal using a demodulator, wherein the in-phase signal is in phase with the oscillation of the mass along the first path, and the out-of-phase signal is out of phase with the in-phase signal.

15 Claims, 5 Drawing Sheets

(56) References Cited

U.S. PATENT DOCUMENTS

| | | | |
|---|---|---|---|
| 7,219,529 B2* | 5/2007 | Fell | G01C 19/567 |
| | | | 702/116 |
| 7,444,869 B2 | 11/2008 | Johnson et al. | |
| 8,347,718 B2 | 1/2013 | Malvern et al. | |
| 2010/0218606 A1* | 9/2010 | Fell | G01C 19/5684 |
| | | | 73/504.13 |
| 2011/0167911 A1* | 7/2011 | Fell | G01C 19/5684 |
| | | | 73/504.12 |
| 2012/0136632 A1 | 5/2012 | Balslink | |
| 2013/0192368 A1* | 8/2013 | Fell | G01C 19/5684 |
| | | | 73/504.13 |
| 2014/0190258 A1 | 7/2014 | Donadel et al. | |
| 2015/0192415 A1* | 7/2015 | Ge | G01C 19/5684 |
| | | | 73/504.13 |
| 2015/0192440 A1 | 7/2015 | Chow et al. | |
| 2015/0285658 A1* | 10/2015 | Zotov | G01C 19/5776 |
| | | | 73/1.77 |
| 2015/0354959 A1* | 12/2015 | Senkal | G01C 19/5684 |
| | | | 73/504.13 |
| 2016/0334441 A1 | 11/2016 | Tin et al. | |
| 2018/0266822 A1* | 9/2018 | Giner | G01C 19/574 |

OTHER PUBLICATIONS

IPO Search Report for International Application No. GB1703638.5 dated Aug. 21, 2017, 3 pages.

* cited by examiner

GYROSCOPE IN-FIELD PROGNOSTICS

FOREIGN PRIORITY

This application claims priority to Great Britain Patent Application No. 1703638.5 filed Mar. 7, 2017, the entire contents of which is incorporated herein by reference.

TECHNICAL FIELD

The present disclosure relates to vibrating structure gyroscopes, particularly Micro electromechanical Systems (MEMS)-based vibrating structure gyroscopes for the measurement of angular rate(s), e.g. in inertial measurement units (IMUs). The present disclosure is concerned with in-field prognostics for gyroscopes.

BACKGROUND

Gyroscopes are sensors that measure angular rate (i.e. the rate of rotation). Gyroscopes are used in many applications, including inertial navigation, robotics, avionics, and automobiles. In inertial navigation applications, gyroscopes may be found in self-contained systems known as "inertial measurement units" (IMUs). IMUs typically contain a plurality of accelerometers and/or gyroscopes, and provide an estimate of an object's travel parameters such as angular rate, acceleration, attitude, position, and velocity, based on the outputs of gyroscope(s) and/or accelerometer(s).

MEMS-based gyroscopes have become ubiquitous in recent years, and are often far more effective than their conventional macroscopic counterparts. MEMS-based gyroscopes are typically implemented using vibrating structures and are often referred to in the art as "vibrating structure gyroscopes" or "VSGs". Vibrating structure gyroscopes generally contain a micro-machined mass that is arranged to oscillate. Typical examples of vibrating structure gyroscopes include vibrating ring gyroscopes, vibrating tuning fork gyroscopes, and also other vibrating structures including e.g. beams, cylinders, hemispherical shells, and disks.

In general operation, the micro-machined mass is driven to oscillate in a predefined mode of vibration, typically a cos nθ mode of vibration (e.g. n=2). The driven mode of vibration is usually called a primary mode. When the gyroscope rotates, a Coriolis force is exerted on the vibrating mass, and this force may cause the mass to oscillate in a secondary mode of vibration, which is different to the primary mode. Typically, the secondary mode of vibration occurs in addition to the primary mode, and the secondary mode results in the mass oscillating along a different direction to the predefined oscillation of the primary mode.

Since the amplitude of oscillation in the secondary mode is proportional to the rate of rotation, the angular rate (e.g. measured in degrees per second) can be determined by directly detecting the amplitude of the secondary oscillation using a suitable sensor (e.g. a transducer such as an inductive or capacitive transducer)—this is known as an "open loop measurement". Alternatively, the angular rate may be measured by applying a restorative force to counter the oscillation in the secondary mode and thereby keep the mass vibrating solely in the primary mode. The restorative force is usually based on the detected amplitude of the secondary oscillation. Since the restorative force is proportional to the applied angular rate, the amplitude of the signal required to nullify the secondary mode provides a measure of the angular rate. This latter arrangement is known in the art as a "closed loop measurement". An example of how to measure the angular rate is discussed in, for example, U.S. Pat. Nos. 5,419,194 and 8,347,718.

An issue with vibrating structure gyroscopes is that the performance of the gyroscope, and in particular the vibrating mass, can degrade as it ages. For example, mechanical stresses may be applied to the VSG in an IMU by the outer casing or its bonding material (e.g. epoxy resin potting) expanding/flexing over time and this may cause the mass to oscillate differently over time. It may also cause the relative orientation of the mass to change with respect to a reference frame. Such changes may lead to erroneous angular rate measurements and, accordingly, it is desirable to keep track of the stress-induced "ageing" of the sensor so that the gyroscope can be re-calibrated, serviced, replaced, or decommissioned when appropriate.

However, at present, measuring an indication of VSG ageing typically requires measuring the relative change in the bias error of a VSG (i.e. the measured signal of the secondary mode of vibration when the gyroscope is not experiencing a rotation) and/or the shift in alignment of the VSG with respect to a reference frame (the so-called misalignment shift). However, due to the sensitivity of the bias error and the misalignment shift to environmental factors (e.g. temperature and mechanical stress being applied to the gyroscope housing), measuring any one of them accurately requires specialist test equipment and is only possible in a controlled factory environment. For example, measuring the bias error may typically require monitoring the output from the gyroscope over an extended period of time, at constant temperature, so as to eliminate the effects of temperature-induced changes. Such measurements may also require using test equipment aligned in a known orientation to allow for Earth rate induced errors.

A consequence of the special conditions and equipment required to measure the bias error and/or misalignment shift is that prognostic analysis of the condition of a VSG cannot be done at any time during operation or in maintenance depots, laboratories or at any other time in the end user environment without the use of special conditions and test equipment. In addition, such prognostic analysis cannot be done by the end user, or in situ for an object (e.g. a car) within which the gyroscope may be incorporated.

Thus, there remains a need to accurately estimate the effective life of a gyroscope or IMU after its initial factory calibration.

SUMMARY

According to a first aspect of the present disclosure there is provided a method for determining an operational characteristic of a vibrating structure gyroscope having a movable mass, the method comprising: driving the mass to oscillate along a first, predefined path; rotating the vibrating structure gyroscope so as to oscillate the mass along a second path, wherein the second path is different to the first, predefined path; sensing the oscillation of the mass along the second path so as to generate a sensing signal; converting the sensing signal into an in-phase signal and an out-of-phase signal using a demodulator, wherein the in-phase signal is in phase with the oscillation of the mass along the first path, and the out-of-phase signal is out of phase with the in-phase signal; determining, in a first mode of operation, the rate of rotation of the gyroscope based on the in-phase signal; and in a second mode of operation: observing the out-of-phase signal at (i) a first time and (ii) a second, subsequent time;

and determining an operational characteristic of the gyroscope based on the out-of-phase signal at the first time and the second time.

According to a further aspect of the present disclosure there is provided a vibrating structure gyroscope comprising: a movable mass arranged to oscillate along (i) a first, predefined path in response to a driving force, and (ii) a second path in response to a rotation of the gyroscope, wherein the second path is different to the first path; an actuator arranged to apply the driving force; a transducer arranged to sense the oscillation of the mass along the second path so as to generate a sensing signal; a demodulator arranged to convert the sensing signal into an in-phase signal and an out-of-phase signal, wherein the in-phase signal is in phase with the oscillation of the mass along the first path, and the out-of-phase signal is out of phase with the in-phase signal; a first signal output arranged to output, in a first mode of operation of the gyroscope, the in-phase signal for determining the rate of rotation of the gyroscope; and a second signal output arranged to output, in the second mode of operation of the gyroscope, (i) the out-of-phase signal produced by the demodulator at a first time and (ii) the out-of-phase signal produced by the demodulator at a second, subsequent time.

From another aspect of the present disclosure there is provided a vibrating structure gyroscope system comprising: a movable mass arranged to oscillate along (i) a first, predefined path in response to a driving force, and (ii) a second path in response to a rotation of the gyroscope, wherein the second path is different to the first path; an actuator arranged to apply the driving force; a transducer arranged to sense the oscillation of the mass along the second path so as to generate a sensing signal; a demodulator arranged to convert the sensing signal into an in-phase signal and an out-of-phase signal, wherein the in-phase signal is in phase with the oscillation of the mass along the first path, and the out-of-phase signal is out of phase with the in-phase signal; and a processor arranged to: determine, in a first mode of operation, the rate of rotation of the gyroscope based on the in-phase signal; and determine, in a second mode of operation, an operational characteristic of the gyroscope based on the out-of-phase signal at a first time and the out-of-phase signal at a second, subsequent time.

The inventors have found that one or more operational characteristics of a gyroscope (e.g. characteristics that represent ageing effects on a gyroscope, such as the bias error or bias shift) may be determined based on the out-of-phase signals at different times—e.g. based on a change in the out-of-phase signal over a period of time. This approach is advantageous because the observation of the out-of-phase signal(s) and the determination of the operational characteristic(s) may be done by the end user whilst the vibrating structure gyroscope (VSG) is installed in an object (e.g. in a car) that uses the gyroscope. Therefore, unlike conventional techniques for determining a gyroscope's operational characteristic(s), the methods and apparatuses herein are not reliant on directly measuring the bias error and/or measuring the misalignment shift. Accordingly, the disclosures herein do not require the gyroscope to be dismantled from the object and analysed with specialist equipment and under specialist test conditions to determine an operational characteristic (which typically changes over time due to ageing effects). Thus, it will be understood that the disclosures herein allow customers to carry out prognostic analysis of the condition of the gyroscope at any time during operation in the field (i.e. outside of the factory environment).

The inventors have also found that determining an operational characteristic of a gyroscope based on the out-of-phase signal is advantageous because the out-of-phase signal is typically much larger than a typical bias error or misalignment shift, and is thereby much easier to detect. Furthermore, the out-of-phase signal of a VSG typically changes by a greater amount than the VSG's bias error or misalignment shift over time for a given aging condition. Accordingly, it is easier (and more accurate due to the better signal to noise ratio) to determine and observe a change in an operational characteristic of a VSG using the out-of-phase signal.

It will also be appreciated that, in conventional gyroscopes, the out-of-phase signal is typically discarded as an error term (e.g. as in a conventional open loop configuration), or only used to generate a force to nullify the secondary oscillation of the mass that arises due to the rotation of the gyroscope (e.g. as in a conventional closed loop configuration). In this respect, the present disclosure has recognised a new and useful purpose of the out-of-phase signal generated by the demodulator.

The operational characteristic may be the bias shift of a VSG. The bias shift is a measure of the relative change in a VSG's bias error as compared to the VSG's bias error at a previous time. Preferably, the bias shift is the relative change in the bias error compared to the bias error measured before the start of a VSG's operational life (e.g. compared to the bias error measured during a factory initialisation step). Usually, the bias error is accounted for during factory calibration so as to reduce its effects on the measurements of angular rate. However, during operational use, the bias error typically increases with time and as a result the VSG may become de-calibrated. Thus it is generally desirable to determine and/or keep track of a VSG's bias shift so that its effect on the angular rate measurement(s) can be accounted for.

Advantageously, the disclosure herein enables a VSG's bias shift to be determined and tracked based on observations of the VSG's out-of-phase signals with time. For example, having found that a relationship exists between (i) a shift in the amplitude of a VSG's out-of-phase signal (relative to the amplitude of the VSG's out-of-phase signal at a previous time) and (ii) the VSG's bias shift, the inventors have appreciated that the VSG's bias shift can be determined based on a change in the amplitude of the VSG's out-of phase signals with time. In some cases (e.g. for vibrating ring gyroscopes in general), a linear relationship has been found between (i) a VSG's shift in out-of-phase amplitude relative to the VSG's out-of-phase amplitude at a previous time (e.g. the so-called quad shift) and (ii) bias shift. Accordingly, in a set of examples of the present disclosure, a bias shift of a VSG may be determined based on a change in amplitude between the VSG's out-of-phase signal at a first time and the VSG's out-of-phase signal at a second, subsequent time. Preferably, a bias shift of a VSG is determined based on a linear relationship between the bias shift and a comparison (i.e. shift) of the amplitude of the out-of-phase signal at the first time and the amplitude of the out-of-phase signal at the second time.

The inventors have also found that the rate of change, the relative change, or the absolute change in a VSG's out of-phase signal (e.g. change in amplitude in the out-of-phase signal) compared to the VSG's out-of-phase signal at a previous time may represent one or more operational characteristics. The operational characteristic may be a parameter describing the mechanically induced stress level on the gyroscope or movable mass. Additionally or alternatively, the operational characteristic may be a parameter describing the relative or absolute age of the gyroscope or movable mass. Furthermore, or alternatively, it may be a parameter describing a defect in the gyroscope or movable mass.

Therefore, it will be understood that the operational characteristic may represent one or more of: a change in a mechanical response of the vibrating structure gyroscope over time; a mechanical stress level of a mounting that mounts the vibrating structure gyroscope to a package or a host system; a mechanical stress level of a package or a host system that houses the vibrating structure gyroscope; a mechanical stress level of the movable mass; an absolute age of the movable mass; a time during which the movable mass has been oscillating; and a diagnostic characteristic representative of a defect in the movable mass.

In a set of preferred examples, the out-of-phase signal at the second time may be compared to the out-of-phase signal at the first time, and the operational characteristic may be determined based on the comparison.

In another set of examples, the operational characteristic may be determined based on one or more of: a difference in amplitude between the out-of-phase signal at the first time and the out-of-phase signal at the second time; and a rate at which the amplitude of the out-of-phase signal changes between the first time and the second time. Preferably, the operational characteristic is determined based on a comparison of the amplitude difference or the rate of change with a predetermined threshold value. The predetermined threshold value may indicate a particular value of one or more operational characteristics.

The methods and apparatuses disclosed herein may be arranged to also (i) compare the operational characteristic with a predefined limit value (e.g. upper limit) indicative of when the vibrating structure gyroscope needs to be replaced, serviced, or re-calibrated, and (ii) determine that the vibrating structure gyroscope needs to be replaced, serviced, or re-calibrated based on the comparison of the operational characteristic with the predefined limit value. Thus, it will be understood that a determination of when a VSG needs to be replaced, serviced, or re-calibrated may be made based on an operational characteristic. Advantageously, this determination can be made while the VSG is in use, e.g. by an end user.

Therefore, it will be understood that monitoring the VSG's out-of-phase signal with time enables the VSG's operational characteristic(s) to be determined during use. Optionally, it also enables the determination of when a VSG needs to be replaced, serviced, or re-calibrated.

In a preferred set of examples, the out-of-phase signal at the first time is a factory-set out-of-phase signal. For example, the out-of-phase signal at the first time may be an out-of-phase signal determined when the VSG is initialised or calibrated during manufacture.

In some examples, the second mode of operation (e.g. a prognosis mode of operation) may comprise rotating the vibrating structure gyroscope at a predefined rate of rotation. This predefined rate of rotation may be zero. The second mode of operation may be initialised manually. Additionally or alternatively, the second mode of operation may be initialised when the determined rate of rotation of the gyroscope in the first mode of operation is equal to the predefined rate of rotation. In this case, the second mode of operation may be initialised in parallel with the first mode of operation, or the VSG may switch to the second mode of operation when the determined rate of rotation of the gyroscope in the first mode of operation is equal to the predefined rate of rotation.

Rotating the vibrating structure gyroscope at a predefined rate of rotation in the second mode of operation provides a consistent reference condition for observing the out-of-phase signal(s). This results in a more accurate determination of the operational characteristics.

In some examples, an operational characteristic is determined based on a predefined relationship describing a change between the out-of-phase signal at the second time and the out-of-phase signal at the first time. For example, as mentioned above, this predefined relationship may be a linear relationship. Alternatively, it may be a relationship that can be described by a decay function (e.g. an exponential decay function dependent on x, a 1/x decay function, a $1/x^2$ decay function, or a logarithmic decay function dependent on x, where x may represent time or bias shift). The predefined relationship may be an empirically-derived relationship.

In a set of examples, the vibrating structure gyroscope may be installed in a movable object, and the second mode of operation may be carried out while the vibrating structure gyroscope is installed in the movable object.

Preferably, the out-of-phase signal is 90 degrees out of phase with the in-phase signal. Accordingly, in a set of examples, the sensing signal may be converted into a quadrature signal pair comprising an in-phase signal and an out-of-phase signal, wherein the in-phase signal is in phase with the oscillation of the mass along the first path, and the out-of-phase signal is 90 degrees out of phase with the in-phase signal. The demodulator used to convert the sensing signals may be a quadrature demodulator.

The VSG may be a vibrating ring gyroscope (VRG) or vibrating tuning fork gyroscope. However, it may also be some other vibrating structure gyroscope having a movable mass comprising one or more of a movable beam, cylinder, hemispherical shell, or disk.

In preferred examples: the VSG is a vibrating ring gyroscope; the movable mass is a substantially planar ring; the oscillation along the first path is a driven vibration along a first axis in the plane of the ring; the oscillation along the second path is a Coriolis-induced vibration along a second axis in the plane of the ring, the second axis being angularly offset relative to the first axis; and the rotation is around an axis normal to the plane of the ring.

The movable mass may be a micro-machined mass—e.g. a silicon micro-machined mass.

The movable mass of a VRG may be oscillated along the first axis at a resonant frequency of the ring. Of course it will be appreciated that the movable mass of any of the VSGs disclosed herein may be driven to oscillate along the first path at a resonant frequency of the movable mass.

The angular offset between the second axis and the first axis of the movable mass may be 45 degrees.

The demodulator in examples herein may convert the sensing signal by mixing the sensing signal with a first reference signal and, separately, mixing the sensing signal with a second reference signal, wherein the second reference signal has the same frequency as the first reference signal, and the phase of the second reference signal is out of phase with the phase of the first reference signal.

Preferably, in various examples, the frequency of the first reference signal corresponds to the frequency of oscillation along the first path. For example, the frequency of the first reference signal may correspond to the resonance frequency at which a movable mass is driven along the first path.

The movable mass may be driven to oscillate along the first path via application of a mechanical force, electrostatic force, or electromagnetic force.

The actuator may be a capacitive actuator, a mechanical actuator, an inductive actuator or any other type of actuator suitable for generating a driving force for oscillating the movable mass along the first path. In some examples, the movable mass may consist of a piezoelectric material. In this case, the movable mass may be driven to oscillate along the first path by applying an oscillating electrical signal to the mass.

The transducer may be a capacitive transducer, an inductive transducer, an optical transducer, or a resistive transducer.

The movable mass of the VSGs herein may be movably mounted to a substrate by one or more flexible support legs.

In some examples, the movable mass may be mounted to a silicon substrate in a MEMS structure.

BRIEF DESCRIPTION OF THE DRAWINGS

Some illustrative embodiments of the invention will now be described, by way of example only, with reference to the accompanying drawings, in which.

An exemplary method for determining an operational characteristic of a vibrating structure gyroscope (VSG) is described with reference to FIGS. 1-5, which relate to a VSG 2 having a substantially planar ring shaped vibrating structure 3 (i.e. a vibrating ring gyroscope—VRG) operating in a closed loop configuration. However, it will be understood that the methods disclosed herein, and in particular the methods for determining an operational characteristic of a vibrating structure gyroscope, may be applied to any type of VSG (e.g. a tuning fork based VSG) operating in either a closed loop or open loop configuration.

Figure 1:
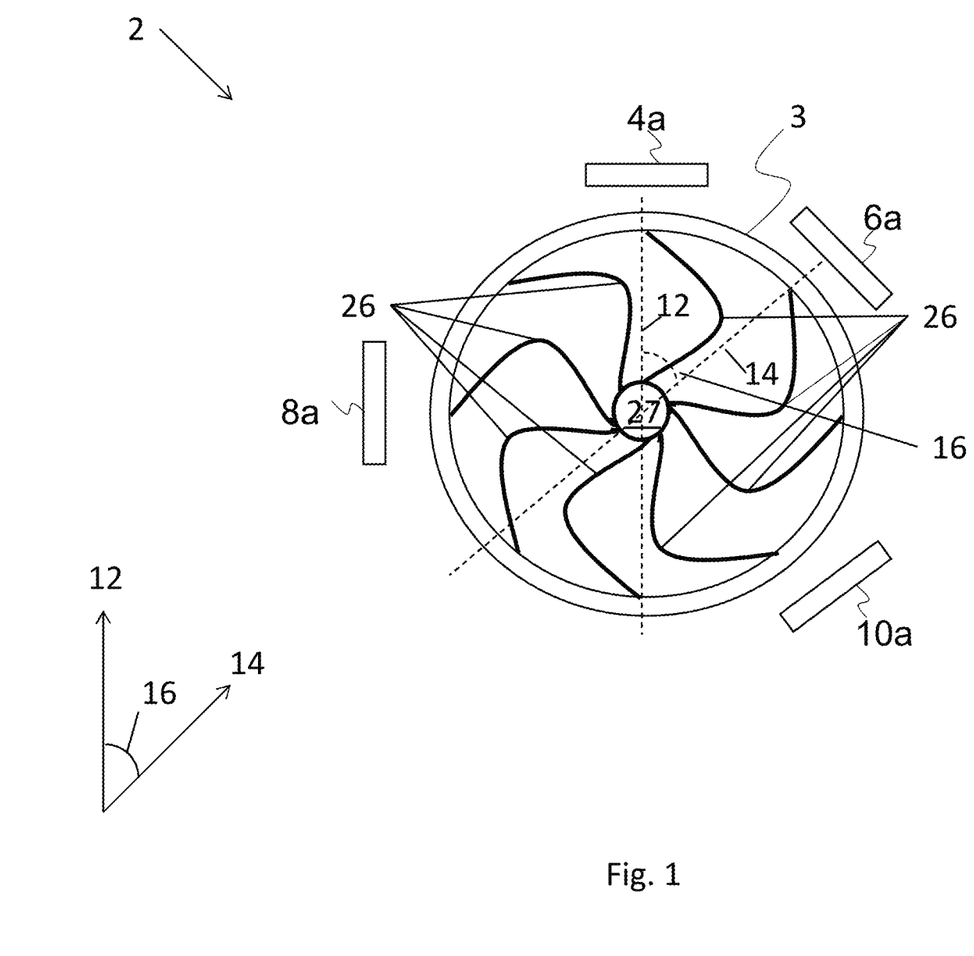
FIG. 1 shows a schematic diagram of a vibrating ring gyroscope (VRG) in accordance with an example of the present disclosure.

FIG. 1 shows a schematic diagram of a VRG 2 in accordance with an example of the present disclosure. The VRG 2 comprises a micro-machined mass in the form of a silicon planar ring structure 3 having eight radially compliant, flexible legs 26 connected to a central hub 27. Spaced around the ring structure 3 is a primary drive actuator 4a, a secondary drive actuator 6a, a primary pick-off transducer 8a, and a secondary pickoff transducer 10a.

Primary drive actuator 4a lies on a primary axis 12 of the ring structure 3, and faces the centre of the ring structure 3. The secondary drive actuator 6a lies on a secondary axis 14, and faces the centre of the ring structure 3. The primary and secondary axes 12, 14 are both in the plane of the ring structure 3 and intersect at the centre of the ring structure 3. The primary pick-off transducer 8a is aligned perpendicularly to, and in the same plane as, the primary drive actuator 4a, and faces the centre of the ring structure 3. The secondary pick-off transducer 10a is aligned perpendicularly to, and in the same plane as, the secondary drive actuator 6a, and faces the centre of the ring structure 3.

The primary and secondary axes 12, 14 are separated by an angle 16 which is dependent on the vibrational properties of the ring structure 3 and the relative angular separation of its modes of oscillation. In this particular example, the primary and secondary modes of vibration (described with reference to FIGS. 3a and 3b below) are separated by 45° and thus the angle 16 separating the primary and secondary axes 12, 14 is also 45°.

The ring structure 3 is supported on a substrate (not shown) by its flexible support legs 26 connected to the central hub 27 so as to enable the ring structure 3 to oscillate in a primary and a secondary mode of vibration. The ring structure 3, support legs 26, and central hub 27 may all in fact be monolithic and manufactured from the same semiconducting substrate e.g. from silicon. This may be achieved, by way of non-limiting example only, using deep reactive-ion etching (DRIE) as is well documented per se. Accordingly, the VRG 2 is preferably manufactured as a MEMS-based device.

Figure 2A:
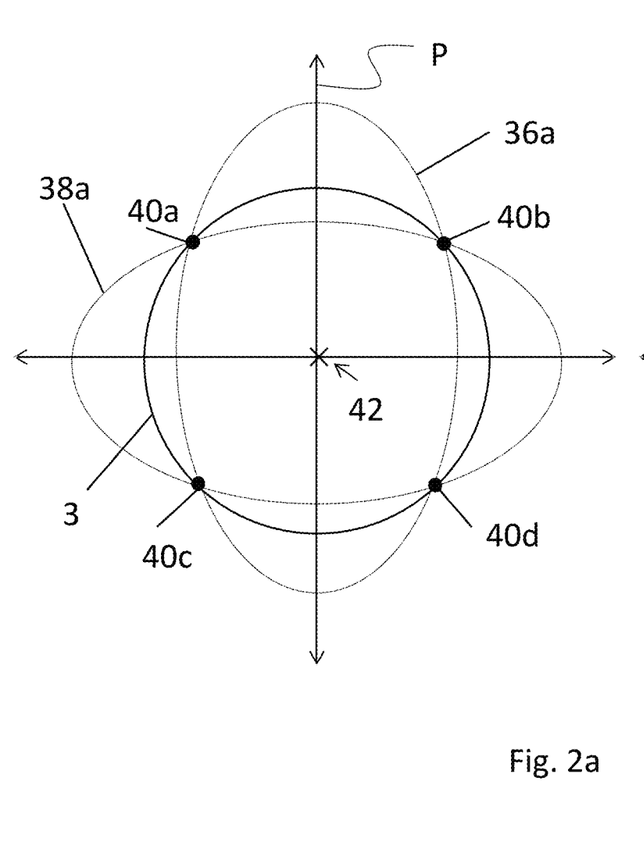
FIGS. 2a and 2b illustrate the primary cos 2 θ mode of vibration associated with the sensor 2 of FIG. 1, and the secondary mode of vibration, respectively.
Figure 2B:
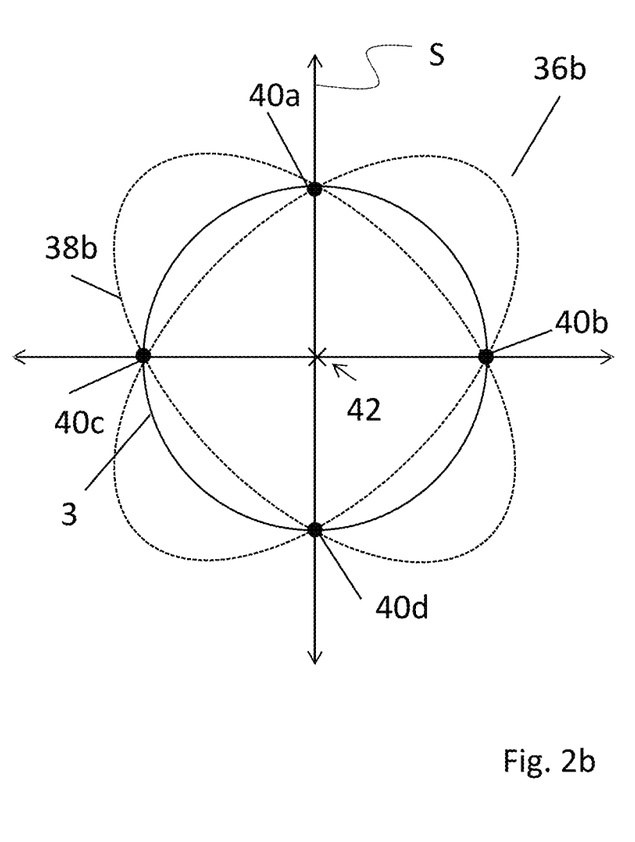

The ring structure 3 may be driven to oscillate in the primary mode of vibration by the primary drive actuator 4a this process will be described in more detail below. In the primary mode of vibration the ring structure 3 oscillates in a cos 2θ mode of vibration along a first, predefined, path on the primary axis 12. The primary mode of vibration deforms the ring structure 3 as shown in FIGS. 2a and 2b, wherein the dotted lines 36a, 38a indicate the extremes of motion of the ring structure 3 in the primary carrier mode P. It can be seen that there is zero radial motion at the node points 40a, 40b, 40c, 40d. The oscillation of the ring's primary mode of vibration is detected by the primary pick-off transducer 8a.

When the VRG 2 is rotated around an axis normal to the plane of the ring 3, Coriolis forces are generated. These forces act at a tangent to the ring perimeter on the primary axis 14 and in turn cause the ring 3 to oscillate in the secondary mode of vibration, along a second path on the secondary axis, with an amplitude that is proportional to the rate of rotation. The secondary mode of vibration may be a sin 2θ mode of vibration as illustrated in FIG. 2b. In FIG. 2b, the dotted lines 36b, 38b indicate the extremes of motion of the ring structure 3 in the secondary response mode S. As a result of the rotation, the position of the nodes 40a-40d is shifted by a small angle depending on the magnitude of the rate of angular rotation and there is a finite amplitude at the position of the secondary pick-off transducer 10a. The motion of the secondary mode of vibration is detected by the secondary pick-off transducer 10a. It will be appreciated that the detected signal (i.e. the secondary pick-off signal 51) is proportional to the rate of rotation.

The present example is directed to closed loop operation. However, it will be appreciated that the VRG 2 may instead operate in an open loop configuration.

In an open loop configuration, the secondary pick-off signal 51 is typically demodulated, using conventional demodulation techniques, with respect to a reference rate signal (e.g. reference rate signal 37) to separate the in-phase and the out-of-phase components of the secondary pick-off signal 51 (i.e. the in-phase and out-of-phase signals). The in-phase signal is that which has the same phase as the primary mode of oscillation. Typically, the amplitude of the in-phase signal is used as a measure of the rate of rotation. The out-of-phase signal is typically disregarded because conventionally it is seen as an error term that arises due to the mode frequencies not being precisely matched. However, unlike in conventional VSG systems, methods and systems in accordance with the present disclosure monitor the out-of-phase signal (e.g. the amplitude of the out-of-phase signal) over one or more periods of time so as to determine an operational characteristic of the gyroscope, such as the bias shift of the VSG. The operational characteristic(s) determined by the method disclosed here may represent e.g. the mechanical stress level applied to the mass, the age of the mass (e.g. the relative age of the mass from the time of manufacture), the time over which the mass has been vibrating (e.g. the time over which the mass has been vibrating since the time of manufacture), a diagnostic parameter indicative of a defect in the mass, a change in a mechanical response of the VSG over time, a mechanical stress level of a mounting between the VSG and a package or a host system; a mechanical stress level of a package housing the VSG, or a bias error of the VSG.

In closed loop operation (see FIG. 3), the secondary pick-off signal 51 is also demodulated with respect to a reference signal (e.g. reference rate signal 37 which may have a frequency corresponding to the resonant frequency of the ring 3 such as a frequency of 14 kHz or 22 kHz) to separate the in-phase signal 52 from the out-of-phase signal 53. This in-phase signal 52 is also in phase with the oscillation in the primary mode of vibration, and the out-of-phase signal 53 is also conventionally disregarded as an error term that is not used for determining the rate of rotation. However, unlike open loop configurations, closed loop configurations use the in-phase and out-of-phase signals 52, 53 to generate a secondary drive signal 60. The secondary drive signal 60 causes the secondary drive actuator 6a to generate a restorative force to counter, and thereby nullify, the secondary mode vibration. The applied force required to nullify the second mode of vibration is directly proportional to the rate of rotation. In some closed loop arrangements, the amplitude of the secondary drive signal 60 is used for determining the rate of rotation. However, in the present arrangement, the rate of rotation is determined based on an output 58 of the in-phase signal. The arrangement of the closed loop configuration of the present example is described in more detail in FIG. 3.

Figure 3:
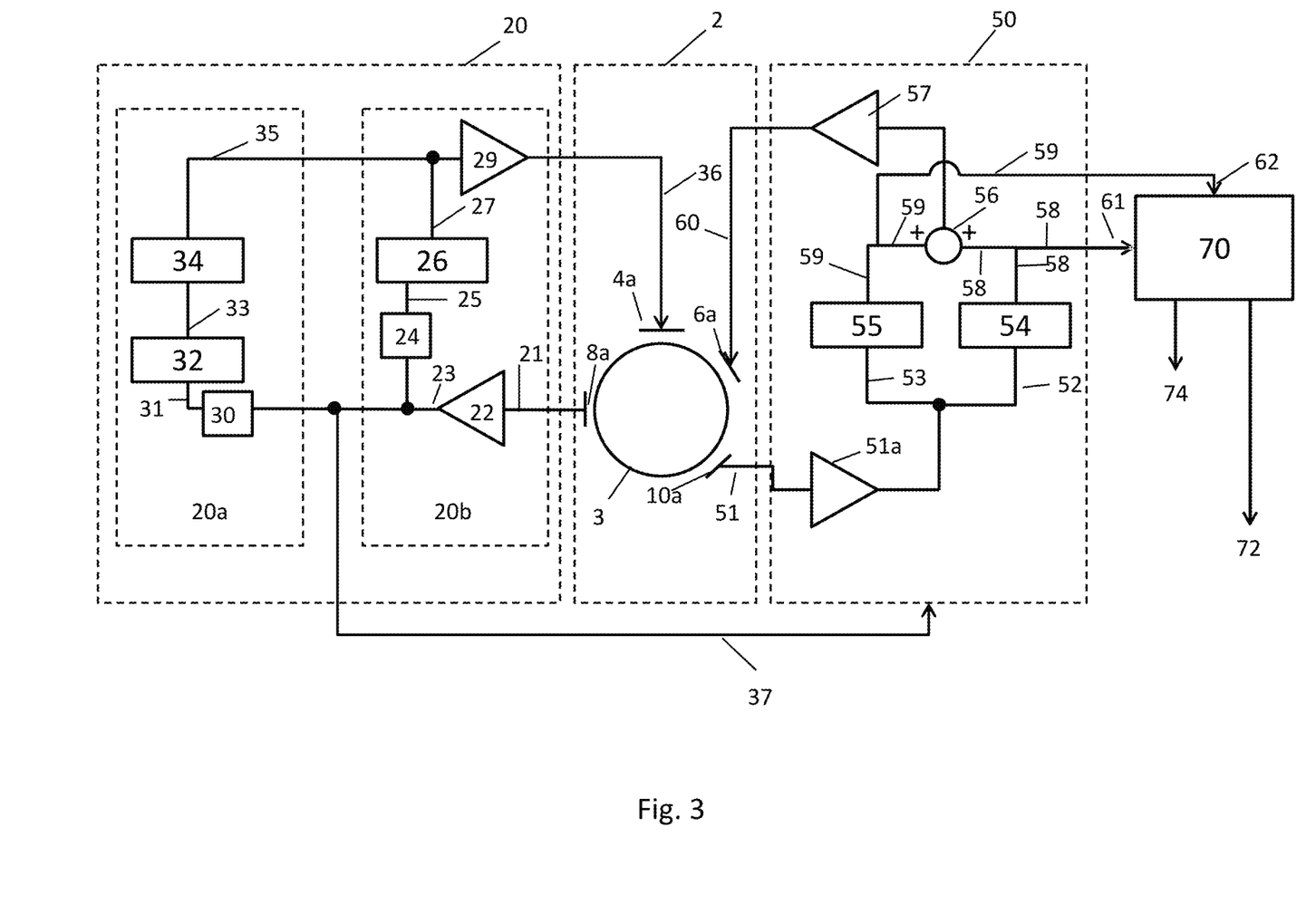
FIG. 3 shows a block diagram of the VRG of FIG. 1 in connection with a primary and a secondary control loop.

FIG. 3 shows a block diagram of the VRG 2 of FIG. 1 in connection with a primary control loop 20 and a secondary control loop 50. For convenience, the radially compliant, flexible legs 26 and the central hub 27 are not illustrated in FIG. 3.

The primary drive control loop 20 controls the primary drive signal 36 sent to the primary drive actuator 4a for oscillating the ring 3 in the primary mode of vibration. The primary drive control loop 20 comprises a frequency control loop 20a and an amplitude control loop 20b. The amplitude control loop 20b includes an amplifier 22, a first demodulator 24, an automatic gain control loop (AGC) 26, and a re-modulator 29. The frequency control loop 20a includes a second demodulator 30, a phase locked loop (PLL) 32, and a voltage controlled oscillator (VCO) 34.

The primary pick-off transducer 8a generates a primary pick-off signal 21 in response to the primary mode of vibration of the ring 3. The primary pick-off signal 21 is amplified by the amplifier 22 and demodulated by the demodulators 24, 30 at a desired frequency for driving the primary mode of vibration (e.g. for driving the primary mode of vibration at a resonant frequency of the ring 3). The PLL 32 compares the relative phases between the demodulated signal 31 from demodulator 30 and the primary drive signal 36. Based on the phase difference, the PLL 32 adjusts the frequency and phase of the VCO 34 to maintain a 90 degree phase shift between the applied primary drive signal 36 and the primary mode of vibration. The AGC 26 compares the demodulated pick-off signal 25 from demodulator 24 to a fixed reference level, $V_{AGC}$, and provides an output signal 27. The output signal 27 adjusts the amplitude of the primary drive signal 36 so as to vibrate the ring 3 in the primary mode of vibration with a fixed amplitude. The signal 35 from the VCO 34 and the signal 27 from the AGC 26 are re-modulated at re-modulator 29 to provide a primary drive signal 36 for driving primary drive actuator 4a.

The secondary control loop 50 comprises a demodulator 51a, an in-phase loop filter 54, an out-of-phase loop filter 55, an adder 56, an in-phase output line 61, an out-of-phase output line 62, and a re-modulator 57. The in-phase output line 61 and the out-of-phase output line 62 are connected to a processor 70. The processor 70 may be part of the secondary control loop 50, or it may be a separate component.

The secondary pick-off transducer 10a generates a secondary pick-off signal 51 in response to the secondary mode of vibration of the ring 3. The secondary pick-off signal 51 is demodulated at a reference frequency (e.g. which may be provided by reference signal 37) by the demodulator 51a to convert the secondary pick-off signal 51 into an in-phase signal 52 and an out-of-phase signal 53. Preferably, the reference signal 37 is the amplified primary pick-off signal 21, and is provided by the primary control loop 20. The in-phase signal 52 is that which has the same phase as the primary mode of oscillation of the ring 3. The in-phase signal 52 and the out-of-phase signal 53 are passed to the in-phase loop filter 54 and the out-of-phase loop filter 55, respectively. These loop filters 54, 55 act to "close the loop" and nullify any in-phase and out-of-phase motion in the secondary vibration mode using known techniques. The amplitude of the in-phase signal required to nullify this motion (i.e. to keep the ring structure 3 resonating in the primary vibration mode) is directly proportional to the Coriolis force experienced by the ring structure 3 and thus the applied angular rate. The in-phase output 58 from the in-phase loop filter 54, and the out-of-phase output 59 from the out-of-phase filter 55, are then summed at adder 56 and input to a re-modulator 57. The re-modulator 57 may also take the reference signal 37 as an input. The re-modulated signal provides the secondary drive signal 60 which is applied to the secondary drive actuator 6a for nullifying the oscillations of the secondary vibration mode.

The in-phase output 58 is provided to the processor 70 via output line 61 in order for the processor 70 to determine the rate of rotation. The rate of rotation is determined by the processor 70 using known techniques. However, unlike a conventional gyroscope, the out-of-phase output 59 is also provided to the processor 70 via output line 62. Thus, it will be appreciated that VRG 2 provides two output lines 61, 62 instead of a single output line as is conventional. Preferably, the out-of-phase output 59 is provided to the processor 70 at least when operating the VRG 2 in a prognosis mode of operation. The out-of-phase output 59 is used by the processor 70 for determining an operational characteristic of the VRG 2. The operational characteristic is output at 72. The operational characteristic may be based on an observed change in the out-of-phase output 59 over a period of time. In this respect, the processor 70 may keep a record of the out-of-phase output 59 at various times (i.e. at least a first time and a second time) when the VRG 2 is rotated at a predetermined rate. The predetermined rate of rotation may be applied by the end-user intentionally when operating in the prognosis mode. Additionally, or alternatively, the processor 70 may record the out-of-phase output 59 whenever it detects that the VRG 2 is being rotated at the predefined rate. The processor 70 may be arranged to determine the rate of rotation using the in-phase output 58 when operating the VRG 2 in a normal mode of operation and/or in the prognosis mode of operation. The angular rate is output at 74. Preferably, the VRG 2 may be arranged to output the in-phase output 58 and/or out-of-phase output 59 when operating the VRG 2 in the normal mode of operation or in the prognosis mode of operation.

Figure 4:
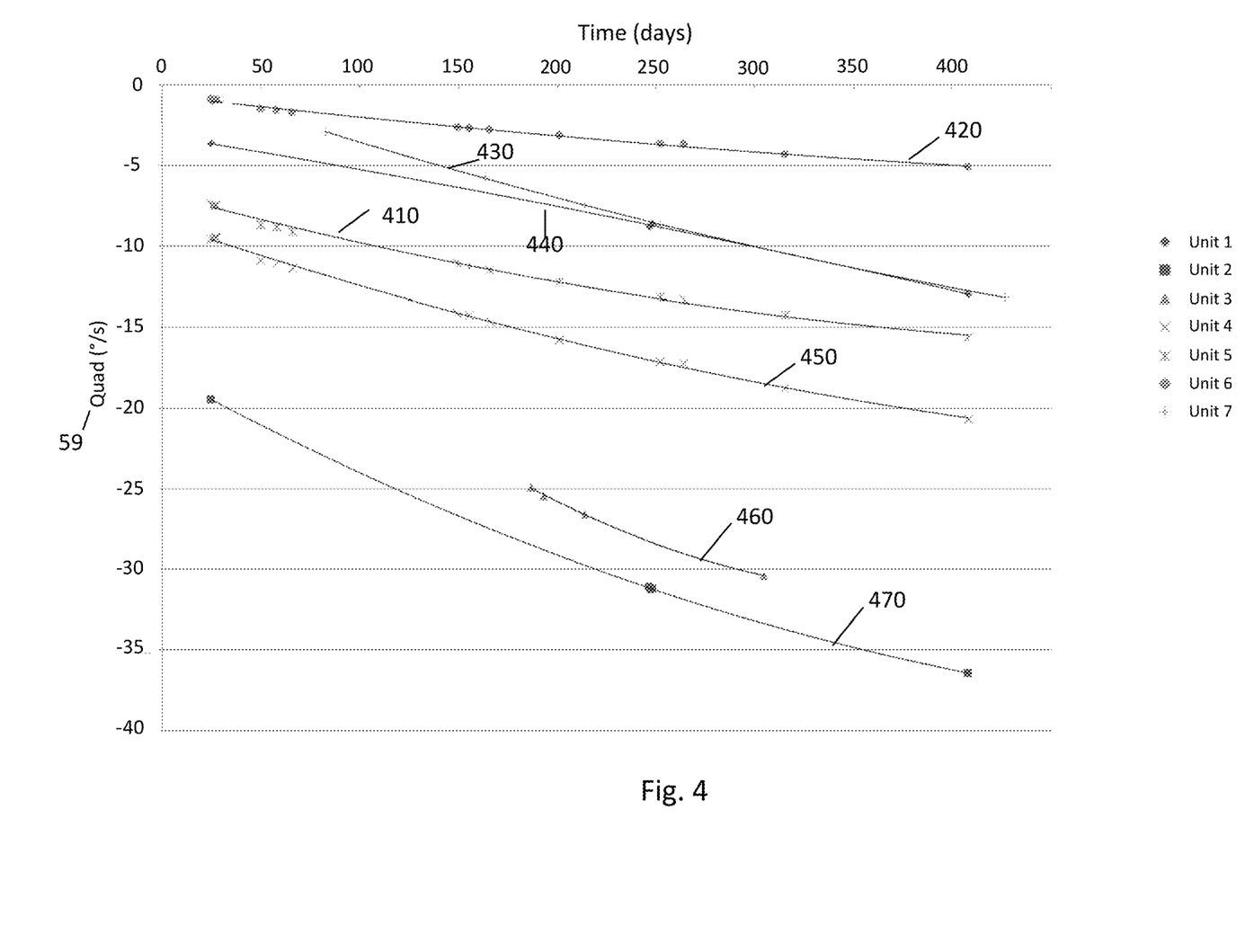
FIG. 4 plots the out-of-phase output from the secondary control loop of FIG. 3 over time for seven VSGs that are each in accordance with the present disclosure.

FIG. 4 illustrates an example of the amplitude of the out-of-phase output 59 recorded by the processor 70 at various different times (i.e. at least a first time and a second time) for the VRG 2 of FIG. 1 (see relationship 410 in FIG. 4). FIG. 4 also shows the observed change in the amplitude of the out-of-phase signal with time from six other VRGs 420-470 that are each in accordance with the present disclosure. It will be appreciated that the amplitude of the out-of-phase signal may be represented as a voltage or quoted in degrees per second on the basis that the amplitude of the out-of-phase signal is directly related to the angular rate of rotation.

It will be seen in FIG. 4 that the amplitude of the out-of-phase output 59 (shown in degrees per second) changes non-linearly with time. In some cases, for example, the change may be described by a decay function (e.g. a function exhibiting an exponential/logarithmic type of decay). The inventors believe that the relative and absolute change in the amplitude of the out-of-phase output 59 (e.g. relative to the amplitude of an out-of-phase output 59 measured at the time of factory calibration) over a given period of time may be related to the mechanical stress applied to the VRG 2 (e.g. mechanical stress induced by external forces on the VRG's 2 casing, and/or changes in the internal stress of the mass). They have also found that the rate at which a VRG's out-of-phase amplitude 59 changes over one or more time periods may provide an indicator of the mechanical stress applied to the VRG, what type of environment the VRG has been exposed to during use, and the effective age of the VRG 2. In addition, they have found that the relative and the absolute change in the amplitude of the out-of-phase output 59 over a given period of time may also provide an indicator of the effective age of the VRG 2.

Figure 5:
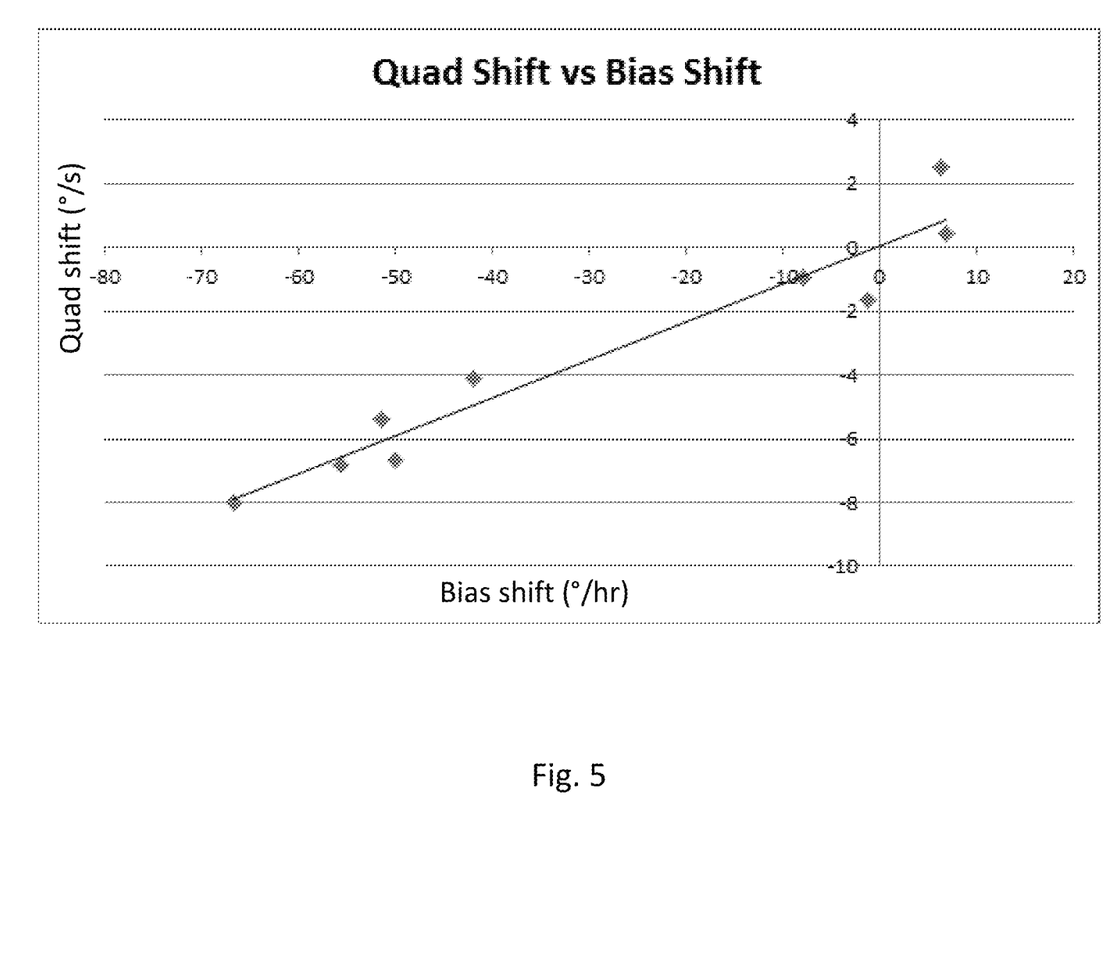
FIG. 5 plots the relationship of the shift in the out-of-phase output against the bias shift of the VSG.

FIG. 5 illustrates an example of the shift in the amplitude of the out-of-phase output 59 recorded by the processor 70 (so-called "quad shift") as a function of the bias shift of a VRG (which is in accordance with the VRG 2 of FIG. 1) over a period of nine months of real time aging. The quad shift is the relative change in the out-of-phase amplitude compared to the out-of-phase amplitude measured before the start of the VRG's operational life. However, it will be appreciated that the quad shift may be the observed change in out-of-phase amplitude relative to the amplitude of the out-of-phase output measured at any previous time. Preferably, the previous bias error and the out-of-phase signals are measured at the same time or sequentially, one after the other.

The bias (also referred to herein as bias error) of a VRG is the secondary pick-off signal measured by the secondary pick-off transducer 10a when the VRG is not being rotated. This bias can be measured using standard methods before a VRG leaves the factory and is usually calibrated out before the VRG starts its operational life. The so-called "bias shift" is the relative change in the bias compared to the bias measured before the start of the VRG's operational life. However, it will be appreciated that the bias shift may be the observed change in the bias relative to the bias measured at any previous time.

In the test carried out here (i.e. FIG. 5), the bias shift was measured in addition to the quad shift of the out-of-phase output 59 so as to assess the accuracy of the prognosis mode. Normally, changes in bias and misalignment are small and difficult to measure, even with specialist IMU test equipment. In contrast, the out-of-phase output 59 has been found to change by a greater amount. Typical quad shifts of 1 deg/sec have been noticed over the life of a VRG in an IMU. Due to such typical magnitudes, this significant shift can easily be measured in maintenance bay conditions without the need for specialist test equipment.

The data shown in FIG. 5 is for an inductive silicon MEMS gyroscope, utilising a circular vibrating ring design with a resonant frequency of 14 kHz. All results were gathered in a controlled environment, using production qualified and calibrated test equipment comprising a 2-axis motion simulator and thermal chamber. FIG. 5 shows how both the "quad" output 59 and bias have shifted within a sample of 9 units over a period of 9 months real time aging, with a strong correlation between the shift in quad and shift in bias.

In operation, it will be appreciated that, as shown in FIG. 4, the out-of-phase amplitude will change in a broadly non-linear fashion over the life of the IMU, and this change may be used to characterise the age, stress level, or other operational characteristic of the VSG.

Additionally, the slope, absolute change, or relative change in the out-of-phase amplitude with time may be used to indicate whether a VSG has been stored/used in an uncontrolled environment (for example in a non-optimal environment). For example, the processor may compare the absolute change, or relative change, in the amplitude of an out-of-phase output 59 for sample 420—between the time of factory calibration on Sep. 28, 2015 and the time of Oct. 7, 2016—to a predetermined threshold value, and depending on whether the change exceeds the threshold value, the processor may issue a signal to indicate that the VRG needs to be replaced, serviced, or re-calibrated. Different levels of threshold value may be used to determine whether the VRG needs to be replaced, serviced, or re-calibrated. Additionally, or alternatively, the processor 70 may compare the slope of the out-of-phase amplitude over time with a predefined threshold slope value. Depending on whether or not the slope (i.e. rate of change) of the out-of-phase relationship with time exceeds the threshold value, the processor 70 may determine the presence of a defect in the mass. In this respect, different slopes may be used to indicate the presence of one or more types of defects. Thus, it will be appreciated that the indication of a defect provides a diagnostic characteristic of the mass.

It will also be appreciated that, as shown in FIG. 5, the quadrature shift will broadly change in a linear fashion with bias shift. The linear change allows the bias shift to be determined based on measurements of the quadrature shift. This finding provides various advantages. For example, by measuring the quadrature shift in the operational field (e.g. in a prognosis mode of operation), the end-user may measure the quadrature shift to determine the bias shift based on their linear relationship. In this way, the end user may determine and adjust for the bias offset more easily and dynamically, without requiring the VSG to be uninstalled and/or tested with specialist equipment and factory conditions.

In addition, the inventors have noted that the slope describing the change in quad shift with bias shift may be used to infer an operational characteristic of a VSG. For example, the slope may be used to infer the mechanical stress applied to the VRG 2 of FIG. 1, the absolute/relative age of the VRG 2, and or a diagnostic parameter indicative of a defect in the VRG 2.

It will be appreciated that the out-of-phase output 59 relationship with time, and/or quad shift relationship with bias error, can be used with any type of VSG to determine an operational characteristic of the VSG.

It will also be appreciated that in an open loop configuration, the demodulated out-of-phase signal may be observed by a processor over time, and/or as a function of the bias error, to determine an operational characteristic. In this respect, it will be understood that the methods of the disclosure herein may be used with both open loop and closed loop VSGs.

The invention claimed is:

1. A method for determining an operational characteristic of a vibrating structure gyroscope having a movable mass, the method comprising:
    driving the mass to oscillate along a first, predefined path;
    rotating the vibrating structure gyroscope so as to oscillate the mass along a second path, wherein the second path is different to the first, predefined path;
    sensing the oscillation of the mass along the second path so as to generate a sensing signal;
    converting the sensing signal into an in-phase signal and an out-of-phase signal using a demodulator, wherein the in-phase signal is in phase with the oscillation of the mass along the first path, and the out-of-phase signal is out of phase with the in-phase signal;
    determining, in a first mode of operation, the rate of rotation of the gyroscope based on the in-phase signal; and
    in a second mode of operation:
        observing the out-of-phase signal at (i) a first time and (ii) a second, subsequent time; and
        determining an operational characteristic of the gyroscope based on at least both the out-of-phase signal observed at the first time and the out-of-phase signal observed at the second time.

2. A method according to claim 1, wherein the operational characteristic is a bias shift of the vibrating structure gyroscope.

3. A method according to claim 1, wherein the operational characteristic represents one or more of: a change in a mechanical response of the vibrating structure gyroscope over time; a mechanical stress level of a mounting that mounts the vibrating structure gyroscope to a package or a host system; a mechanical stress level of a package or a host system that houses the vibrating structure gyroscope; a mechanical stress level of the movable mass; an absolute age of the movable mass; a time during which the movable mass has been oscillating; and a diagnostic characteristic representative of a defect in the movable mass.

4. A method according to claim 1, further comprising comparing the out-of-phase signal at the second time to the out-of-phase signal at the first time, and determining the operational characteristic based on the comparison.

5. A method according to claim 4, wherein the operational characteristic is determined based on one or more of: a difference in amplitude between the out-of-phase signal at the first time and the out-of-phase signal at the second time; and a rate at which the amplitude of the out-of-phase signal changes between the first time and the second time.

6. A method according to claim 5, wherein the operational characteristic is determined based on a comparison of the amplitude difference or the rate of change with a predetermined threshold value.

7. A method according to claim 6,
    wherein the predetermined threshold value is indicative of when the vibrating structure gyroscope needs to be replaced, serviced, or re-calibrated; and the method further comprises:
    determining that the vibrating structure gyroscope needs to be replaced, serviced, or re-calibrated based on the comparison of the amplitude difference or the rate of change with the predetermined threshold value.

8. A method according to claim 1, wherein the out-of-phase signal at the first time is an out-of-phase signal measured at a time of factory calibration.

9. A method according to claim 1, comprising rotating the vibrating structure gyroscope at a predetermined rate of rotation in the second mode of operation.

10. A method according to claim 1, wherein the vibrating structure gyroscope is installed in a movable object, and the second mode of operation is carried out while the vibrating structure gyroscope is installed in the movable object.

11. A method according to claim 1, wherein:
    the vibrating structure gyroscope is a vibrating ring gyroscope;
    the movable mass is a substantially planar ring;
    the oscillation along the first path is a driven vibration along a first axis in the plane of the ring;
    the oscillation along the second path is a Coriolis-induced vibration along a second axis in the plane of the ring, the second axis being angularly offset relative to the first axis; and
    the rotation is around an axis normal to the plane of the ring.

12. A method according to claim 1, wherein the demodulator converts the sensing signal by mixing the sensing signal with a first reference signal and, separately, mixing the sensing signal with a second reference signal, wherein the second reference signal has the same frequency as the first reference signal, and the phase of the second reference signal is out of phase with the phase of the first reference signal.

13. A vibrating structure gyroscope comprising:
    a movable mass arranged to oscillate along (i) a first, predefined path in response to a driving force, and (ii) a second path in response to a rotation of the gyroscope, wherein the second path is different to the first path;
    an actuator arranged to apply the driving force;
    a transducer arranged to sense the oscillation of the mass along the second path so as to generate a sensing signal;
    a demodulator arranged to convert the sensing signal into an in-phase signal and an out-of-phase signal, wherein the in-phase signal is in phase with the oscillation of the mass along the first path, and the out-of-phase signal is out of phase with the in-phase signal;
    a first signal output arranged to output, in a first mode of operation of the gyroscope, the in-phase signal for determining the rate of rotation of the gyroscope; and
    a second signal output arranged to output, in the second mode of operation of the gyroscope, output (i) the out-of-phase signal produced by the demodulator at a first time and (ii) the out-of-phase signal produced by the demodulator at a second, subsequent time.

14. A vibrating structure gyroscope system comprising:
    a movable mass arranged to oscillate along (i) a first, predefined path in response to a driving force, and (ii) a second path in response to a rotation of the gyroscope, wherein the second path is different to the first path;
    an actuator arranged to apply the driving force;
    a transducer arranged to sense the oscillation of the mass along the second path so as to generate a sensing signal;

a demodulator arranged to convert the sensing signal into an in-phase signal and an out-of-phase signal, wherein the in-phase signal is in phase with the oscillation of the mass along the first path, and the out-of-phase signal is out of phase with the in-phase signal; and a processor arranged to:

determine, in a first mode of operation, the rate of rotation of the gyroscope based on the in-phase signal; and determine, in a second mode of operation, an operational characteristic of the gyroscope based on at least both the out-of-phase signal observed at a first time and the out-of-phase signal observed at a second, subsequent time.

15. A method according to claim 1, further comprising determining when the vibrating structure gyroscope needs to be replaced, serviced, or re-calibrated based on the operational characteristic.

* * * * *